United States Patent [19]

Duchateau et al.

[11] 4,334,908

[45] Jun. 15, 1982

[54] VITREOUS FERTILIZER COMPOSITIONS

[75] Inventors: Jacques Duchateau, Recquignies; Christien Van den Bossche, Wavrin, both of France

[73] Assignee: BFG Glassgroup, Paris, France

[21] Appl. No.: 79,987

[22] Filed: Sep. 28, 1979

[30] Foreign Application Priority Data

Sep. 29, 1978 [GB] United Kingdom ............... 38762/78

[51] Int. Cl.$^3$ .................. C05B 7/00; C05B 19/00; C05D 9/02

[52] U.S. Cl. ............................................ 71/52; 71/45; 71/46; 71/53; 71/64.3; 71/64.7; 71/64.11; 71/64.13; 71/903; 65/22; 501/39; 501/45; 501/48; 501/73; 47/64

[58] Field of Search .................. 71/32, 33, 62, 44, 45, 71/46, 48, 52, 64 D, 64 F, 64 G, 64 A, 64.3, 64.11, 903, 64.13, 53, 64.7; 106/40 V, 52, 47 R, 75; 65/22, 20; 47/59, 64; 501/39, 45, 48, 73

[56] References Cited

U.S. PATENT DOCUMENTS

| | | | |
|---|---|---|---|
| 2,533,027 | 12/1950 | Maust et al. | 71/44 |
| 3,095,312 | 6/1963 | Holmes | 106/75 |
| 3,320,043 | 5/1967 | MacKenzie | 106/47 R |
| 3,342,572 | 9/1967 | MacAvoy | 106/40 V X |
| 3,481,749 | 12/1969 | Godron | 501/48 X |
| 3,812,619 | 5/1974 | Wood et al. | 71/64 G X |
| 3,897,236 | 7/1975 | Roberts | 71/32 X |
| 3,930,833 | 1/1976 | Roberts | 501/45 X |
| 4,059,423 | 11/1977 | De Vos et al. | 65/22 X |
| 4,123,248 | 10/1978 | Drake | 71/64 F X |
| 4,148,623 | 4/1979 | Drake | 71/64 G X |
| 4,168,962 | 9/1979 | Lambeth | 71/64 G X |

FOREIGN PATENT DOCUMENTS

| | | | |
|---|---|---|---|
| 1082284 | 5/1958 | Fed. Rep. of Germany | 71/64 G |
| 2738803 | 3/1979 | Fed. Rep. of Germany | 71/64 F |
| 1227482 | 4/1971 | United Kingdom | 106/40 V |
| 1512637 | 7/1974 | United Kingdom | 71/64 F |

OTHER PUBLICATIONS

Badger and Bray; "Soluble Glass May Offer Fertilizer Possibilities"; Chemical & Metallurgical Eng., Apr. 1945; pp. 112 and 113.

*Primary Examiner*—Richard V. Fisher
*Attorney, Agent, or Firm*—Spencer & Kaye

[57] ABSTRACT

A composition of matter for use as a vitreous fertilizer comprising a soluble vitreous constituent comprising the following ingredients: 35 to 55 moles %, $P_2O_5$; less than 10 moles %, $K_2O$; and the balance to 100 moles %, CaO and/or MgO. The balance of the composition, if any, is constituted by optional additions of nutrient proportions of one or more micro-nutrients in plant assimilable form, and/or optional additions of one or more plant-inert filler materials. Such compositions have favorable nutrient release rates. The invention also encompasses compositions of matter adapted for use as a plant fertilizer which comprises soluble vitreous plant nutrient release material in expanded or cellular form, and to methods of plant cultivation using such compositions.

16 Claims, No Drawings

VITREOUS FERTILIZER COMPOSITIONS

BACKGROUND OF THE INVENTION

The present invention relates to compositions of matter which are adapted for use as vitreous fertilizers.

The use of vitreous fertilizers has been well known for over thirty years. A paper appeared in Chemical and Metallurgical Engineering April 1945 by Badger and Bray entitled "Soluble glass may offer fertilizer possibilities".

The opening paragraph of this paper reads as follows: "It is a curious coincidence that, with the exception of water, organic matter, and nitrogen, all of the elements required for plant growth may be incorporated in a glass. The major chemical elements, as potassium, calcium, magnesium, and phosphorus, as well as the minor elements needed by plants—as sulphur, iron, boron, zinc, manganese, and copper—may be included in the glass structure. This fact, coupled with the knowledge that glasses may be made with varying resistances to solution by water, suggests a method whereby plant nutrients may be made available to the plant without danger of "burning" it, by a choice of a suitable glass composition which has the desired rate of disintegration. The ease with which glass can be manipulated suggests many commercial adaptations for soil-less growth experiments as well as ordinary applications for soil enrichment. For example, nutrient glass may be pressed into various shapes, as flower pots or blocks of various sizes; surfaces with large areas exposed to the soil may be formed readily by grinding the glass into powder or by blowing it into glass wool."

The benefits of using vitreous fertilizers which dissolve at a relatively high rate as compared with conventional glasses but at a low rate as compared with conventional fertilizers are manifold.

Because of the slow dissolution rate, an adequate level of nutrient can be maintained at the level of the plant roots during the whole period of plant growth without applying an excessive amount of fertilizer and without the necessity for frequent fertilizer spreading.

If excessive amounts of conventional chemical fertilizer are applied, firstly there is severe danger of burning or searing the plants, and secondly, large proportions of the fertilizer will be dissolved by rainfall or other watering and carried down into the water table or to a nearby watercourse. This is wasteful.

Frequent application of smaller quantities of conventional chemical fertilizers is expensive in time and equipment, and the frequent passage of heavy spreading equipment has been known to cause excessive break-up of the soil which reduces growth yield.

Vitreous fertilizers may be applied one every two to four years with very good results, and they are also cleaner and easier to handle than conventional chemical fertilizers.

SUMMARY OF THE INVENTION

It is an object of the present invention to provide a novel composition of matter which is adapted for use as a vitreous fertilizer.

According to the present invention there is provided a composition of matter adapted for use as a vitreous fertilizer characterised in that it comprises a soluble vitreous constituent made up of the following ingredients:

$P_2O_5$ from 35 to 55 moles %,
$K_2O$ below 10 moles %,
CaO and/or MgO balance to 100 moles %,
the balance of the composition, if any, being constituted by optional additions of nutrient proportions of one or more micro-nutrients in plant assimilable form, and/or optional additions of one or more plant-inert filler materials.

DETAILED DESCRIPTION OF THE INVENTION

The compositions of the invention have the advantage of enabling the maintenance at the plant root level of a slight acidity (pH between 4 and 7) which is favourable from the point of view of plant nutrition in furnishing nutrients in forms which are completely assimilable by the vegetation.

It is to be noted that an excess of $P_2O_5$ gives a vitreous constituent which is too acid for general use. Preferably said soluble vitreous constituent contains between 45 and 55 moles % $P_2O_5$, so as to maintain favourable acidity levels. Such a quantity of $P_2O_5$ in the soluble vitreous constituent gives a greater relative amount of assimilable plant nutrient in the fertilizer.

The optimum ratio of CaO to MgO will depend on the type of cultivation in view. Such ratio may be altered to compensate for any calcium or magnesium deficiency in any particular soil, or for example it may be adjusted to an optimum ratio for a particular plant species if the composition of matter according to the invention is to be used hydroponically, whether alone or in mixture with sand and/or gravel.

It should be noted that the CaO/MgO ratio has an effect on the rate at which nutrients will dissolve out of fertilizers according to the invention; in general, the higher the relative proportion of CaO, the higher the dissolution rate.

The proportion of $K_2O$ also affects the dissolution rate of the said soluble vitreous constituent of fertilizers according to the invention, and proportions of 10 moles % or more give too high a solubility rate for the purpose in view. Preferably said soluble vitreous constituent contains 5 moles % $K_2O$ or less.

The amount of nutrient available to plants will clearly depend upon the proportion of said soluble vitreous constituent in the fertilizer composition. Preferably said composition of matter contains at least 70% by weight of said soluble vitreous constituent.

In some preferred embodiments of the invention, said composition of matter contains $SiO_2$ as plant-inert filler material in an amount of less than 20 moles %. This permits the use, in the manufacture of the composition of matter, of various starting materials in which silicon is present as an impurity and which are accordingly less costly. Similarly, less costly starting material may be used if said composition of matter is permitted to contain $Al_2O_3$ as plant-inert filler material in an amount of less than 5% by weight. As examples of low cost starting materials may be cited incinerated domestic refuse, recovered glass and rocks, including mine tailings. As a specific low cost starting material may be cited iron-or steelworks slag from high phosphorus ores.

Advantageously said composition of matter contains nutrient proportions of one or more of the following micronutrient elements in plant assimilable form: Fe, Zn, Mn, B, Cu, Mo. This enables substantially all of the plants nutrient requirements to be afforded by a fertilizer composition according to the invention, and is thus especially valuable for hydroponic plant culture.

In a specific example, one or more of such micronutrient materials is introduced, in oxide form, into a vitrifiable batch for forming a soluble vitreous fertilizer composition in the following maximum proportions by weight of that composition:

| | | |
|---|---|---|
| Fe | 1 | g/kg |
| Zn | 1 | g/kg |
| B | 0.7 | g/kg |
| Mn | 0.1 | g/kg |
| Cu | 0.03 | g/kg |

Preferably, said composition of matter is in granular form, and advantageously the granules are graded so that at least 90% by weight of them fall within a size range of which the upper limit is no more than twice the lower limit. This facilitates mechanical spreading of the fertilizer composition.

The optimum values for the upper and lower size limits will depend upon the circumstance of use to which the composition is to be put, because the granulometry has a marked effect on the rate at which nutrients will dissolve out of a fertilizer of any given composition. Thus for example the granulometry of different compositions can be varied so that they have the same dissolution rate despite differences in their relative proportions of CaO and MgO.

In the most preferred embodiments of the invention, said composition of matter is in cellulated form. This has a number of advantages. If the cellulation is of closed cell form, arrangement of the composition over or around the plant roots will provide thermal insulation so that the roots remain at a more nearly constant temperature and this promotes growth. If the cellulation is of open cell form, then water retention and/or aeration of the soil are promoted, again with a favourable effect on plant growth. Such cellulated composition may have any desired shape, for example the composition may be shaped as flower pots, but it is preferably in granular form as referred to above.

In some preferred embodiments of the invention, said composition of matter comprises said soluble vitreous constituent in a first phase and a second phase of substantially insoluble cellular vitreous material. Such second phase must clearly be of open cell form if it surrounds the soluble phase, but it may be of open or closed form if it forms a core of the composition.

In this way, the advantages of using cellular granules in insulation, aeration and/or water retention are maintained even after the nutrient portion of the fertilizer composition has dissolved. Similar advantages are afforded when said composition of matter comprises granules (whether cellulated or not) of said soluble vitreous constituent in admixture with cellulated granules of a substantially insoluble vitreous material.

When said composition of matter includes cellulated granules having a first soluble nutrient releasing vitreous phase and a second substantially insoluble vitreous phase, such phases should remain distinct, that is, substantially unmixed, so that the solubility of the first phase is not affected. This can be achieved by ensuring that over the range of temperatures to which the granules are subjected in a cellulating process, the two vitreous phases have different viscosities, for example by suitable selecting the constituents of the insoluble vitreous phase.

The provision of cellular plant nutrient material affords many important advantages, and is itself believed to be new, and accordingly, the present invention, in its second aspect provides a composition of matter adapted for use as a plant fertilizer, characterised in that it comprises soluble vitreous plant nutrient release material in expanded or cellular form, and preferably in granular form.

Such soluble vitreous plant nutrient release material of the composition of matter according to the second aspect of the invention is preferably constituted as said soluble vitreous constituent of a composition of matter according to the first aspect of the invention.

The present invention also relates to methods of plant culture using a composition of matter in accordance with the first or second aspect of the invention as above defined, and accordingly provides a method of cultivating plants or seeds in soil comprising placing in contact with such soil a composition of matter according to the first and/or second aspect of the invention as above defined. The invention also extends to method of hydroponic plant culture, and thus includes a method of cultivating plants comprising surrounding their root structures with a granular composition of matter according to the first and/or second aspect of the invention as above described.

Certain preferred embodiments of the invention will now be more particularly described by way of the following examples.

EXAMPLE 1

The following ingredients are mixed together to form a vitrifiable batch:

| | | |
|---|---|---|
| Ammonium dihydrogen phosphate | NH₄H₂PO₄ | 51.3 kg |
| Potassium dihydrogen phosphate | KH₂PO₄ | 13.5 kg |
| Calcium hydrogen phosphate | CaHPO₄ . H₂O | 76.7 kg |

The batch is heated to 500° C. to eliminate volatile decomposition products of the ammonium dihydrogen phosphate and any water bound in the other materials. The batch is then further heated so that it melts completely, and is cooled rapidly to give a soluble vitreous material of the following composition:

| | |
|---|---|
| P₂O₅ | 50 moles % |
| CaO | 45 moles % |
| K₂O | 5 moles % |

EXAMPLE 2

The soluble vitreous material formed by the method described in Example 1 is crushed to form a granular material for use as a fertilizer for distributing on the surface of soil in which plants are to be grown.

In a variant of this Example, the crushed granular material is passed through successive sieves of different mesh sizes. The separated grades thus obtained facilitate uniform mechanical spreading, and the different grades have different solubility rates.

By way of example, the smallest fraction of granular vitreous material separated which could pass a mesh size of 100 microns had a rate of solubility such that substantially all the soluble phosphorus in the vitreous material was dissolved within seven days. This fraction is thus more suitable for use in forming beads of expanded vitreous material than for use on its own. On the other hand, a coarser fraction having mesh size of between 1.6 mm and 2.5 mm has a solubility rate such that after fifteen days approximately 45% by weight of its soluble phosphorus will have dissolved. This material is suitable for use in cases where a high rate of nutrient release is desired in the early stages of plant growth.

EXAMPLE 3

The following ingredients were mixed together to form a vitrifiable batch:

| Ammonium dihydrogen phosphate | $NH_4H_2PO_4$ | 53.4 kg |
|---|---|---|
| Potassium dihydrogen phosphate | $KH_2PO_4$ | 14.0 kg |
| Calcium hydrogen phosphate | $CaHPO_4$ | 28.8 kg |
| Magnesium hydrogen phosphate | $MgHPO_4 . 3H_2O$ | 44.0 kg |

The batch was heated to 500° C. to eliminate volatile decomposition products, and was then further heated to complete melting. After rapid cooling there remained a soluble vitreous fertilizer material of the following composition:

| $P_2O_5$ | 50 moles % |
|---|---|
| CaO | 20.5 moles % |
| MgO | 24.5 moles % |
| $K_2O$ | 5.0 moles % |

This material was crushed and then graded.

For a given granulometry, this fertilizer material has a lower solubility rate than the fertilizer of Examples 1 and 2.

By way of example, the amount of nutrient released expressed in mg dissolved phosphorus per gram of fertilizer material is, for the 100 micron mesh size fraction, 220 after 7 days and 230 after 15 days, while for the 0.5 mm to 0.8 mm mesh size it is approximately 90 after 15 days and 200 after 60 days. These figures indicate that the 0.5 mm to 0.8 mm fraction of the fertilizer according to this Example dissolves at a slower rate than the 1.6 mm to 2.5 mm fraction of the fertilizer according to Example 1. This is mainly due to the presence of a relatively high proportion of MgO as compared with CaO.

EXAMPLE 4

The fraction of granular vitreous material obtained by the process of Example 3 which passed through a mesh of 250 microns was mixed with powdered coal dust of the same mesh size in the weight ratio of 1 part coal dust to 20 parts vitreous material. This mixture was then blended into a solution containing 40 g of dry potassium silicate per liter of water in an amount of 10 liters of solution to 20 Kg of vitreous material, and water was added to produce a slip having a viscosity of approximately 500 cP (corresponding with less than 40% by weight of water). This slip was sprayed in a drying tower in the form of droplets in the size range 100 to 500 microns. The temperature in the drying tower was 300° C.

During the heating in the drying tower the aqueous solution of potassium silicate in each droplet dried leaving a cohesive matrix binding together the individual grains in each dried droplet or bead. These beads were found on removal from the drying tower to have a microcellular structure due to the evaporation of water within the beads during their formation.

In a subsequent step, the beads were fired in a furnace at a temperature above 450° C., so that the coal dust particles burnt, the vitreous material softened and commenced to flow under the pressure of the entrapped combustion gases, and the potassium silicate binder became chemically integrated with the vitreous material. After cooling, the thus formed bodies were found to be of a unitary mass of glass having a cellular structure.

EXAMPLE 5

In a variant of Example 4, the cellulated beads are made not using the vitreous starting material specified, but rather the vitrifiable batch of the composition given in Example 3. By operating in accordance with this example, the soluble vitreous material was first formed in the furnace in which the beads were fired. The firing temperature was sufficient to vitrify the batch, It should be borne in mind that there is no need to fire the vitreous material thus formed, so that firing temperatures can be much lower than in conventional clear glass manufacturing processes.

EXAMPLE 6

A vitrifiable batch was formed using the ingredients specified in Example 1 but substituting varying amounts of magnesium ($MgHPO_4$) for the calcium specified, and varying the amounts of salts to give soluble vitreous materials of the following compositions (Moles %).

| $P_2O_5$ | CaO | MgO | $K_2O$ |
|---|---|---|---|
| 51 | 40 | — | 9 |
| 55 | 38 | — | 7 |
| 36 | 56 | — | 8 |
| 40 | 60 | — | — |
| 50 | 50 | — | — |
| 50 | 30 | 15 | 5 |
| 50 | 15 | 30 | 5 |
| 50 | — | 45 | 5 |

The various batches were preheated to 500° C. to eliminate volatile decomposition products and water and were then fired at 1450° C. to melt them. The resulting vitreous melts were then rapidly cooled.

EXAMPLE 7

Each of the vitreous materials obtained in Example 6 was subjected to the cellulating process specified in Example 4 except that sodium silicate was used as binder in place of potassium silicate.

EXAMPLE 8

Vitrifiable grains of the fertilizer composition given in Example 3 were mixed with similar sized grains of an inert silica-lime glass containing magnesium oxide. The grains were sintered together in known manner to form a glass having an open cell structure. The sintering temperature was controlled so that the two vitreous compositions, because of their different viscosities at that temperature, remained as substantially separate intermixed phases.

In a variant of this Example, all or part of the magnesium oxide in the inert glass is replaced by aluminum oxide.

In a second variant, a natural mineral such as felspar or granite is used as inert material.

The solubility rate and total amount of fertilizer released by the soluble phase of such a sintered material can be adjusted to desired levels by varying the granulometry and relative proportions of the ingredients.

We claim:

1. A composition of matter for use as a plant fertilizer comprising water soluble vitreous plant nutrient release material and a silicate binder chemically integrated with said vitreous material, to form a unitary mass of glass in expanded or cellular form, wherein said soluble vitreous plant nutrient release material comprises 35 to 55 moles % $P_2O_5$; 5 moles % $K_2O$ or less; and the balance to 100 moles %, CaO and/or MgO.

2. A composition of matter for use as a vitreous fertilizer constitutent comprising a water soluble vitreous constitutent comprising:
   35 to 55 moles %, $P_2O_5$;
   less than 5 moles %, $K_2O$; and
   the balance to 100 moles %, CaO and/or MgO,
wherein said composition comprises a first phase containing said soluble vitreous constituent and a second phase of substantially insoluble cellular vitreous material.

3. A composition of matter according to claim 2, wherein said soluble vitreous constituent contains between 45 and 55 moles % $P_2O_5$.

4. A composition of matter according to claim 2 wherein the composition contains at least 70% by weight of said soluble vitreous constituent.

5. A composition of matter according to claim 2 wherein the composition is in granular form.

6. A composition of matter according to claim 5 wherein said granules are graded so that at least 90% by weight of them fall within a size range of which the upper limit is no more than twice the lower limit.

7. A composition of matter according to claim 2 in which the first phase is in cellulated form.

8. A composition of matter according to claim 2, wherein the second phase is of open cell form and surrounds the first phase.

9. A composition of matter according to claim 2, wherein the second phase forms a core of the composition and is surrounded by said first phase.

10. A composition of matter according to claim 2 additionally comprising at least one micro-nutrient in plant assimilable form and/or at least one plant-inert filler material.

11. A composition of matter according to claim 10 containing $SiO_2$ as plant-inert filler material in an amount of less than 20 moles %.

12. A composition of matter according to claim 10 containing $Al_2O_3$ as plant-inert filler material in an amount of less than 5% by weight.

13. A composition of matter according to claim 10 containing nutrient proportions of at least one of the micro-nutrient elements Fe, Zn, Mn, B, Cu, and Mo, in plant assimilable form.

14. A composition of matter according to claim 2 containing:
   (a) at least 70% by weight of said water soluble vitreous constituent;
   (b) 0 to 5% by weight of $Al_2O_3$ as plant inert filler material and
   0 to 20 moles % of $SiO_2$ as plant inert filler material; and
   (c) 0 to 1 g/kg of Fe micro-nutrient element in plant assimiable form,
   0 to 1 g/kg of Zn micro-nutrient element in plant assimiable form,
   0 to 0.7 g/kg of B micro-nutrient element in plant assimiable form,
   0 to 0.1 g/kg of Mn micro-nutrient element in plant assimiable form, and
   0 to 0.03 g/kg of Cu micro-nutrient element in plant assimiable form.

15. A method of cultivating plants or seeds in soil comprising placing in contact with such soil, a composition of matter according to claim 2.

16. A method of cultivating plants comprising surrounding their root structure with a granular composition of matter according to claim 2.

* * * * *